United States Patent
Chang et al.

(10) Patent No.: US 10,289,707 B2
(45) Date of Patent: May 14, 2019

(54) DATA SKIPPING AND COMPRESSION THROUGH PARTITIONING OF DATA

(71) Applicant: International Business Machines Corporation, Armonk, NY (US)

(72) Inventors: Yuan-Chi Chang, Armonk, NY (US); Timothy R. Malkemus, Round Rock, TX (US); Mohammad Sadoghi Hamedani, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 14/821,915

(22) Filed: Aug. 10, 2015

(65) Prior Publication Data
US 2017/0046367 A1    Feb. 16, 2017

(51) Int. Cl.
*G06F 17/30* (2006.01)

(52) U.S. Cl.
CPC .. *G06F 17/30303* (2013.01); *G06F 17/30371* (2013.01); *G06F 17/30486* (2013.01)

(58) Field of Classification Search
CPC ......... G06F 17/30303; G06F 17/30371; G06F 17/30486
See application file for complete search history.

(56) References Cited

U.S. PATENT DOCUMENTS

| 7,898,442 B1 | 3/2011 | Sovik |
| 2010/0115246 A1 | 5/2010 | Seshadri et al. |
| 2010/0153349 A1 | 6/2010 | Schroth |
| 2012/0109888 A1 | 5/2012 | Zhang et al. |
| 2013/0275399 A1 | 10/2013 | Amit et al. |
| 2013/0297575 A1 | 11/2013 | Fallon et al. |
| 2014/0095520 A1* | 4/2014 | Ziauddin ........... G06F 17/30492 707/756 |
| 2014/0129530 A1 | 5/2014 | Raufman |

OTHER PUBLICATIONS

Bhattacharjee et al., "Efficient Query Processing for Multi-Dimensionally Clustered Tables in DB2", Proceedings of the 29th VLDB Conference, Berlin, Germany, 2003, pp. 1-12.
Lightstone et al., "Automated design of multidimensional clustering tables for relational databases", Proceedings of the 30th VLDB Conference, Toronto, Canada, 2004, pp. 1170-1181.
Padmanabhan et al., "Multi-Dimensional Clustering: A New Data Layout Scheme in DB2", SIGMOD 2003, Jun. 9-12, 2003, San Diego, CA, Copyright 2003 ACM 1-58113-634-X/03/06, pp. 637-641.
Stonebraker et al., "C-Store: A Column-oriented DBMS", Proceedings of the 31st VLDB Conference, Trondheim, Norway, 2005, pp. 553-564.
"Disk Change Block Tracking Using a Separate Partition", An IP.com Prior Art Database Technical Disclosure, IP.com No. 000207604, IP.com Electronic Publication: Jun. 3, 2011, Copyright © 2010, 2011 Symantec Corporation, pp. 1-11.

* cited by examiner

*Primary Examiner* — Apu M Mofiz
*Assistant Examiner* — Husam Turki Samara
(74) *Attorney, Agent, or Firm* — Stephen R. Yoder

(57) ABSTRACT

Conventionally, in addition to indexing, a synopsis of a base table of a database is used to skip and compress data. However, scanning of the entire synopsis for all queries is required, which takes a long time when the synopsis gets significantly big in a large data warehouse. A method for efficient data skipping and compression through vertical partitioning of data is provided to eliminate the cost of synopsis storage overhead while enabling the synopsis search functionality.

18 Claims, 6 Drawing Sheets

DATA SKIPPING AND COMPRESSION THROUGH PARTITIONING OF DATA

FIELD OF INVENTION

The present invention relates generally to the field of data management, and more particularly to skipping and compression of data.

BACKGROUND

Data skipping skips unnecessary processing of irrelevant or duplicate data, loading only the information that needs to be analyzed. Specifically, data skipping refers to scanning a column (or table) to find rows that qualify for a given query and skip over data that doesn't qualify for your query. When skipping irrelevant data, the irrelevant data is not read into memory from disk and CPU resources are not demanded to find out why those irrelevant rows/columns are not needed in the first place.

Data compression involves encoding information using fewer bits than the original representation. Compression can be either lossy or lossless. Lossless compression reduces bits by identifying and eliminating statistical redundancy. No information is lost in lossless compression. Lossy compression reduces bits by identifying unnecessary information and removing it. Compression is useful as it helps reduce resource usage, such as data storage space or transmission capacity.

SUMMARY

According to an aspect of the present invention, there is a method, computer program product and/or system for data skipping and compression, that performs the following operations (not necessarily in the following order): partitioning projection of each data value of a set of data values into a plurality of data types, wherein the date types include numerical and/or comparable bytes value; and storing the plurality of data types in a set of separate columns, wherein there is a separate column for each data type; wherein: at least the step of storing the plurality of data types is performed by computer software running on computer hardware.

DETAILED DESCRIPTION

Figure 1:
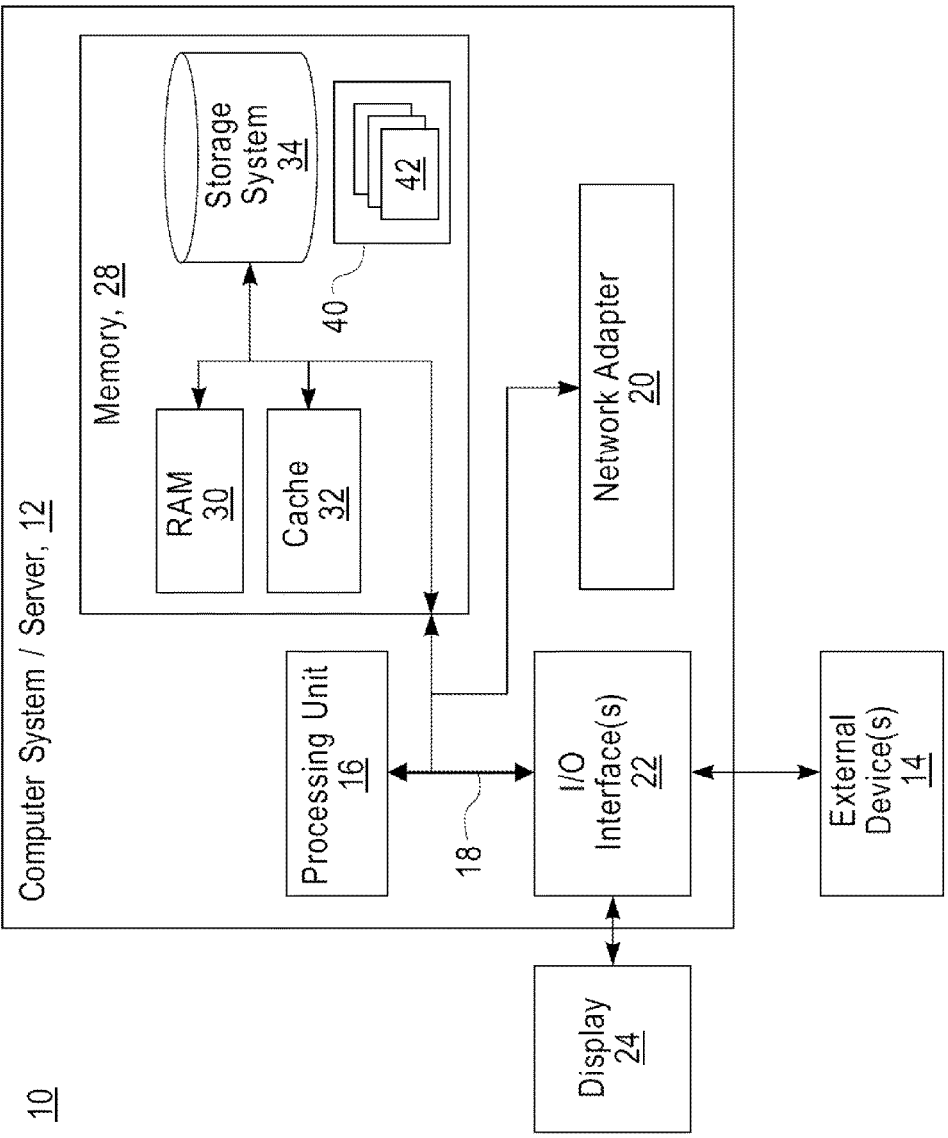
FIG. 1 depicts a cloud computing node used in a first embodiment of a system according to the present invention.

The present invention provides a method for efficient data skipping and compression through vertical byte partitioning of data is provided to eliminate the cost of multi-column range summaries storage overhead while enabling the multi-column range summaries search functionality. Data (each data attribute or a set of correlated data attributes) is re-organized and vertically partitioned in a set of bytes columns, where the higher order bytes of data are first scanned prior to scanning the lower order bytes of data. The lower order bytes are visited only if the higher order bytes satisfy the query predicate partially. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid Elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured Service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
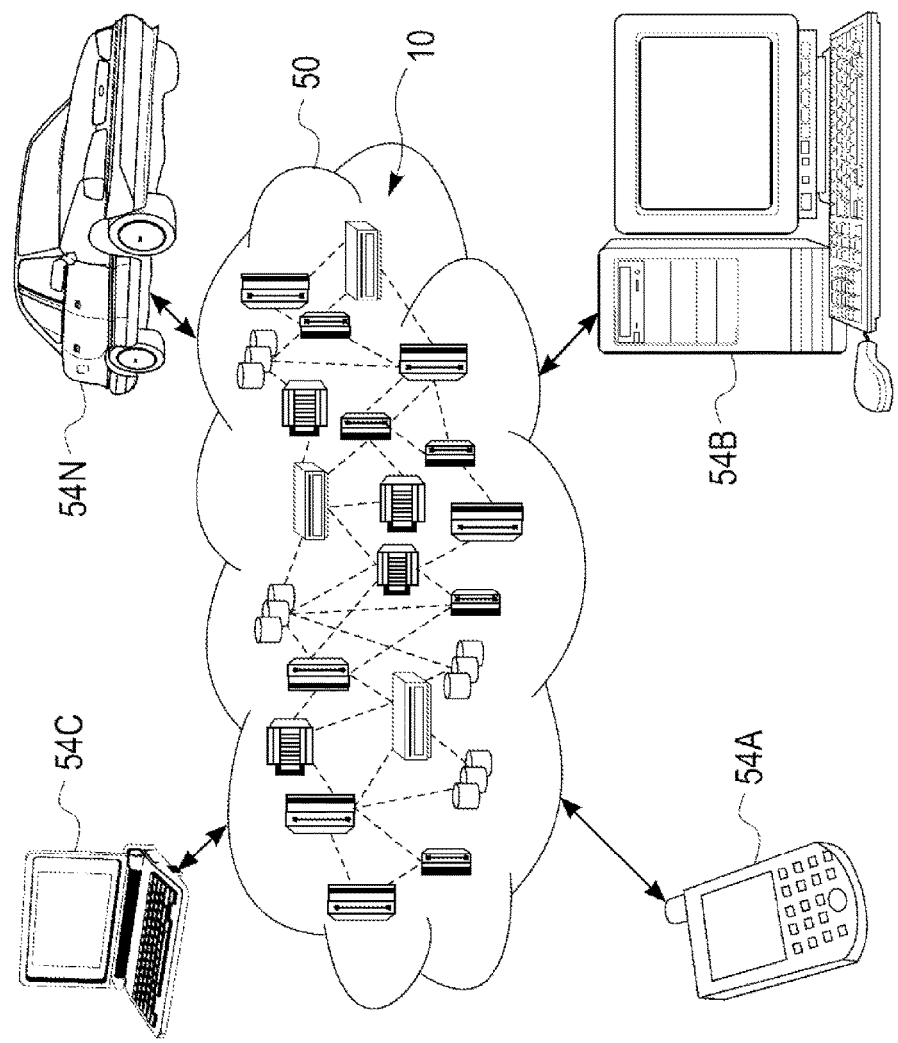
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
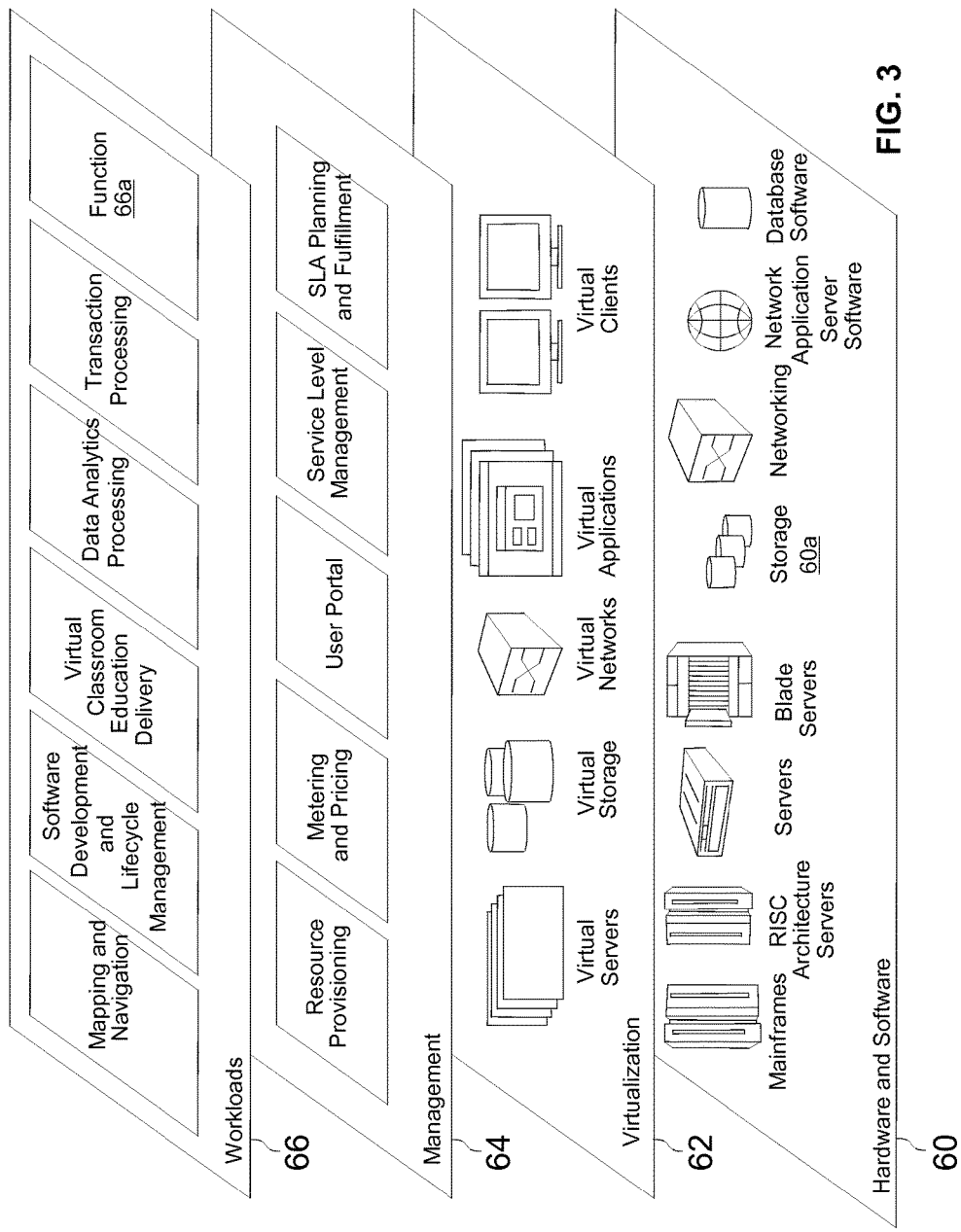
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 4:
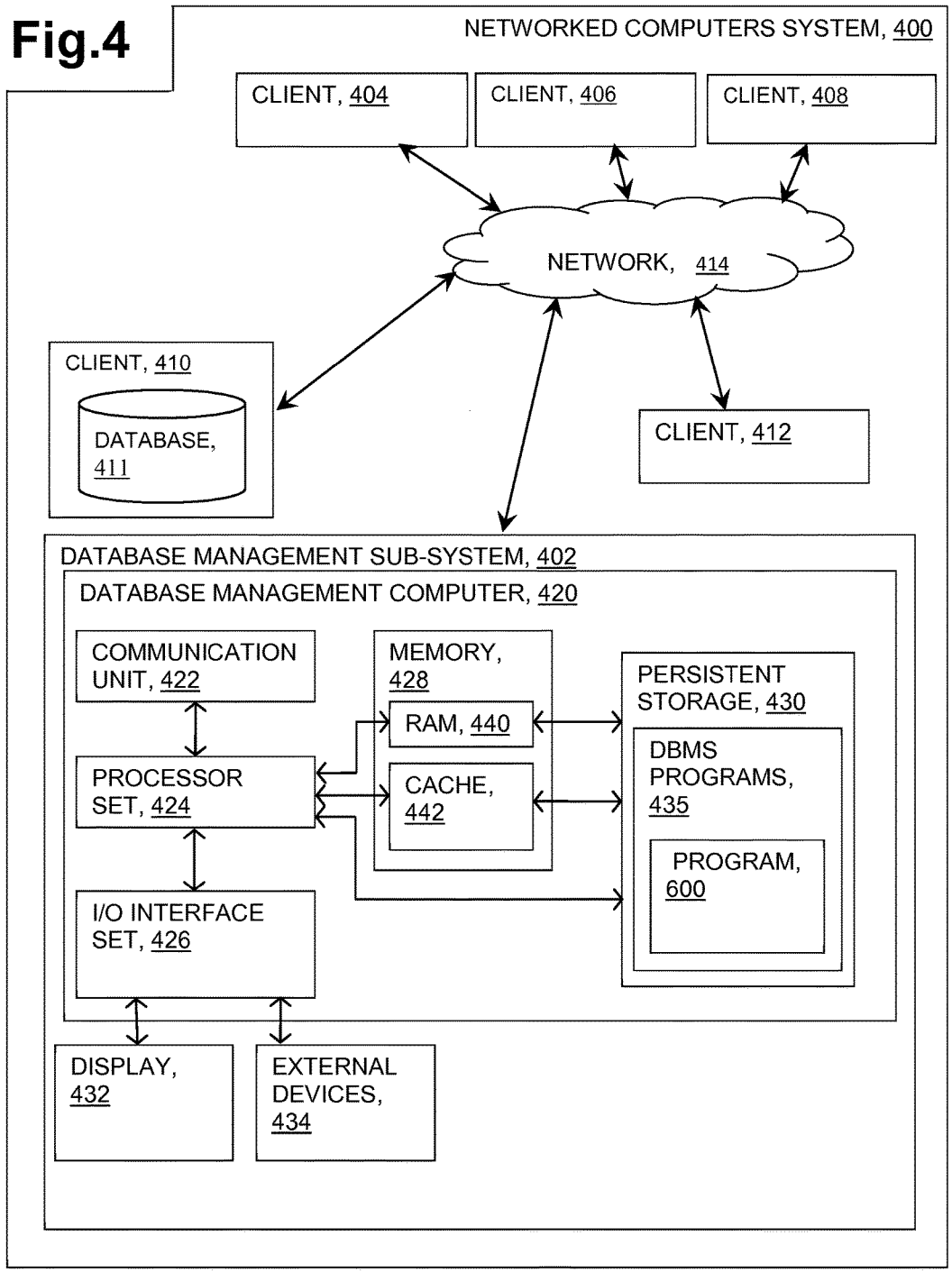
FIG. 4 is a schematic view of a second embodiment of a system according to the present invention.

Some embodiments of the present invention will now be described in detail with reference to the Figures. FIG. 4 is a functional block diagram illustrating various portions of networked computers system 400, in accordance with one embodiment of the present invention, including: database management (DBM) sub-system 402; client sub-systems 404, 406, 408, 410, 412; database 411; communication network 414; database management computer 420; communication unit 422; processor set 424; input/output (I/O) interface set 426; memory device 428; persistent storage device 430; display device 432; external device set 434; database management system (DBMS) programs 435; random access memory (RAM) devices 440; cache memory device 442; and program 600.

Sub-system 402 is, in many respects, representative of the various computer sub-system(s) in the present invention. Accordingly, several portions of sub-system 402 will now be discussed in the following paragraphs.

Sub-system 402 may be a laptop computer, tablet computer, netbook computer, personal computer (PC), a desktop computer, a personal digital assistant (PDA), a smart phone, or any programmable electronic device capable of communicating with the client sub-systems via network 414. Program 600 is a collection of machine readable instructions and/or data that is used to create, manage, and control certain software functions that will be discussed in detail below.

Sub-system 402 is capable of communicating with other computer sub-systems via network 414. Network 414 can be, for example, a local area network (LAN), a wide area network (WAN) such as the Internet, or a combination of the two, and can include wired, wireless, or fiber optic connections. In general, network 414 can be any combination of connections and protocols that will support communications between server and client sub-systems.

Sub-system 402 is shown as a block diagram with many double arrows. These double arrows (no separate reference numerals) represent a communications fabric, which provides communications between various components of sub-system 402. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 428 and persistent storage 430 are computer readable storage media. In general, memory 428 can include any suitable volatile or non-volatile computer readable storage media. It is further noted that, now and/or in the near future: (i) external device(s) 434 may be able to supply, some or all, memory for sub-system 402; and/or (ii) devices external to sub-system 402 may be able to provide memory for sub-system 402.

Program 600 is stored in persistent storage 430 for access and/or execution by one or more of the respective computer processors 204, usually through one or more memories of memory 428. Program 600 is located within DBMS programs 435, where other programs (not shown) carry out various functions of database management. Persistent storage 430: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 430.

Program 600 may include both machine readable and performable instructions, and/or substantive data (that is, the type of data stored in a database). In this particular embodiment, persistent storage 430 includes a magnetic hard disk drive. To name some possible variations, persistent storage 430 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 430 may also be removable. For example, a removable hard drive may be used for persistent storage 430. Other examples include optical and magnetic disks, thumb drives, and smart cards that are inserted into a drive for transfer onto another computer readable storage medium that is also part of persistent storage 430.

Communications unit 422, in these examples, provides for communications with other data processing systems or devices external to sub-system 402. In these examples, communications unit 422 includes one or more network interface cards. Communications unit 422 may provide communications through the use of either, or both, physical and wireless communications links. Any software modules discussed herein may be downloaded to a persistent storage device (such as persistent storage device 430) through a communications unit (such as communications unit 422).

I/O interface set 426 allows for input and output of data with other devices that may be connected locally in data communication with computer 420. For example, I/O interface set 426 provides a connection to external device set 434. External device set 234 will typically include devices such as a keyboard, keypad, a touch screen, and/or some other suitable input device. External device set 234 can also include portable computer readable storage media such as, for example, thumb drives, portable optical or magnetic disks, and memory cards. Software and data used to practice embodiments of the present invention, for example, program 600, can be stored on such portable computer readable storage media. In these embodiments the relevant software may (or may not) be loaded, in whole or in part, onto persistent storage device 430 via I/O interface set 426. I/O interface set 426 also connects in data communication with display device 432.

Display device 432 provides a mechanism to display data to a user and may be, for example, a computer monitor or a smart phone display screen.

Database 411 is an organized collection of data. The data is typically organized to model aspects of reality in a way that supports processes requiring information. For example, modelling the availability of rooms in hotels in a way that supports finding a hotel with vacancies.

Program 600 operates to organize data in upper and lower bytes to unify data and data summarization and to avoid the need for the redundant data summarization. Further, program 600 scans and skips data blocks of columns in a database (e.g., a relational database), where each column is stored and/or sorted in upper and lower bytes and the data blocks of columns are given by scanning a synopsis of a base table in the database.

Some embodiments of the present invention recognize the following facts, potential problems and/or potential areas for improvement with respect to the current state of the art: (i) lots of indexes on tables are conventionally used for data skipping; (ii) every time a row is updated index keys are updated as well; (iii) in addition to indexing, data skipping is primarily achieved using a synopsis (i.e., summary of min/max values in a data block); and/or (iv) in a real customer situations, synopsis can get significantly big in a large data warehouse, over a billion rows and thus scanning a synopsis itself can take a long time.

Conventionally, one of techniques to speed up analytical queries in an operational data store/database is to identify and built many indexes. Identifying the right indexes has been a challenge in a real-world setting and a huge burden on database administrator. In addition, maintaining indexes increases the updates cost in transaction processing (also prevalent in operational data store) and all changes to indexes must be logged, yet another prohibiting cost. To overcome the problems of identifying and maintaining indexes, a paradigm for speeding up queries is explored through multi-column range summaries on an ordered set of correlated attributes, for example, scanning and locating the most relevant data based on columns instead of rows which results in faster processing. However, these multi-column range summaries introduces additional space and management overhead because, they must be stored and maintained (for insert, update, delete) in addition to maintaining the base data.

Conventionally, one way for multi-column range summary is a summary of min/max values in data block, also referred to as synopsis, by which data skipping is primarily achieved. Synopsis are simple and easy to use and requires minimal tuning. However, Synopsis requires the scanning of the entire synopsis for all queries. Further, in real situations, synopsis can get really big in a large data warehouse (e.g., over a billion rows). Thus scanning synopsis itself can take a long time, and the synopsis may requires its own "synopsis." An example of obtaining a synopsis from a base table is shown in Tables 1 and 2 where a base table in a database is converted to a synopsis of the base table by summarizing the min/max values in data blocks. Herein the data block refers to a chunk of data or a set of records in the base table. For example, in Table 1, rows 1-3, which are referred to as a data block in the base table, are grouped to reduce to one single row in the synopsis in Table 2; and the data in column B of rows 1-3 in the base table is summarized to data $b_1$-$b_3$ (min-max) in the synopsis.

TABLE 1

A base table in a database.

|   | A | B | C | D | ... |
|---|---|---|---|---|-----|
| 1 | $a_1$ | $b_1$ | $c_1$ | $d_1$ | |
| 2 | $a_1$ | $b_1$ | $c_3$ | $d_5$ | |
| 3 | $a_1$ | $b_3$ | $c_1$ | $d_8$ | |
| 4 | $a_2$ | $b_2$ | $c_2$ | $d_1$ | |
| 5 | $a_2$ | $b_2$ | $c_2$ | $d_9$ | |
| 6 | $a_3$ | $b_3$ | $c_1$ | $d_2$ | |

TABLE 2

A synopsis of the base table in Table 1.

|   | A | B | C | D | ... |
|---|---|---|---|---|-----|
| 1-3 | $a_1$ | $b_1$-$b_3$ | $c_1$-$c_3$ | $d_1$-$d_8$ | |
| 4-5 | $a_1$ | $b_2$ | $c_2$ | $d_1$-$d_9$ | |
| 6 | $a_1$ | $b_3$ | $c_1$ | $d_2$ | |

Some embodiments of the present invention provide a method for changing the representation of data to create an implicit synopsis (also referred to as an embedded second-level synopsis) as opposed to a conventional synopsis (also referred to as an explicit synopsis). The conventional synopsis herein is stored explicitly and separate from the base table, as shown in Tables 1 and 2. Essentially the implicit synopsis is embedded within the base table data by changing the data representation. Thus, the storage and maintenance of the conventional synopsis data is avoided, and the cost of accessing synopsis in addition to accessing the base table data is avoided as well. Furthermore, for correlated columns, higher/upper bytes values of a set of attributes are stored only once, which not only reduces the storage but also reduces the scanning, i.e., the embedded synopsis is stored once.

One example is described in Table 3, 4 and 5. Table 3 shows a base table having a set of columns A, B, and C, and each data value in each column of the set of columns is divided into an upper bytes value and a lower bytes value, such as, $a_1a_2$ where $a_1$ represents an upper bytes value and $a_2$ represents a lower bytes value. In Table 4, each upper bytes value and its corresponding lower bytes value are stored separately in different columns, such as, $a_1$ is stored in column $A_1$ and $a_2$ is stored in column $A_2$, where column $A_1$ may be an implicit synopsis (i.e., an embedded synopsis in the base table) Further in Table 5, for a set of correlated columns, such as, columns A and C in Table 3, which have same upper bytes values (i.e., data values in columns $A_1$ and $C_1$ in Table 4 are the same), the same upper bytes values are stored only once.

TABLE 3

A base table having data values that are divided into an upper bytes value and a lower bytes value.

|   | A | B | C | ... |
|---|---|---|---|-----|
| 1 | $a_1a_1$ | $b_1b_1$ | $a_1c_1$ | |
| 2 | $a_1a_2$ | $b_1b_2$ | $a_1c_3$ | |
| 3 | $a_1a_3$ | $b_2b_1$ | $a_1c_1$ | |
| 4 | $a_2a_1$ | $b_2b_2$ | $a_2c_2$ | |

TABLE 3-continued

A base table having data values that are divided into an upper bytes value and a lower bytes value.

|   | A | B | C | ... |
|---|---|---|---|-----|
| 5 | $a_2a_2$ | $b_2b_3$ | $a_2c_2$ | |
| 6 | $a_3a_1$ | $b_2b_4$ | $a_3c_1$ | |

TABLE 4

The base table in Table 3 in which the upper bytes value and its corresponding lower bytes value are stored separately in different columns.

|   | $A_1$ | $A_2$ | $B_1$ | $B_2$ | $C_1$ | $C_2$ | ... |
|---|-------|-------|-------|-------|-------|-------|-----|
| 1 | $a_1$ | $a_1$ | $b_1$ | $b_1$ | $a_1$ | $c_1$ | |
| 2 | $a_1$ | $a_2$ | $b_1$ | $b_2$ | $a_1$ | $c_3$ | |
| 3 | $a_1$ | $a_3$ | $b_2$ | $b_1$ | $a_1$ | $c_1$ | |
| 4 | $a_2$ | $a_1$ | $b_2$ | $b_2$ | $a_2$ | $c_2$ | |
| 5 | $a_2$ | $a_2$ | $b_2$ | $b_3$ | $a_2$ | $c_2$ | |
| 6 | $a_3$ | $a_1$ | $b_2$ | $b_4$ | $a_3$ | $c_1$ | |

TABLE 5

The base table in Table 4 in which the same upper bytes values are stored only once.

|   | $A_1, C_1$ | $A_2$ | $B_1$ | $B_2$ | $C_2$ | ... |
|---|-----------|-------|-------|-------|-------|-----|
| 1 | $a_1$ | $a_1$ | $b_1$ | $b_1$ | $c_1$ | |
| 2 | $a_1$ | $a_2$ | $b_1$ | $b_2$ | $c_3$ | |
| 3 | $a_1$ | $a_3$ | $b_2$ | $b_1$ | $c_1$ | |
| 4 | $a_2$ | $a_1$ | $b_2$ | $b_2$ | $c_2$ | |
| 5 | $a_2$ | $a_2$ | $b_2$ | $b_3$ | $c_2$ | |
| 6 | $a_3$ | $a_1$ | $b_2$ | $b_4$ | $c_1$ | |

Another specific example is given herein, for example, a set of data: 10, 11, 12, 13, 14, 15, 16, 17, 18, 19, 20 are provided. In this case, a conventional way is to store the set of data: 10, 11, 12, 13, 14, 15, 16, 17, 18, 19, 20 in a column of a base table, and an explicit synopsis: 10-20 is created and stored in a separate table. Some embodiments of the present invention provides an alternative way for storing the set of data: dividing each data of the set of data into first digit (i.e., upper bytes) of 1, 1, 1, 1, 1, 1, 1, 1, 1, 1, 2, and second digit (i.e., lower bytes) of 0, 1, 2, 3, 4, 5, 6, 7, 8, 9, 0, which are stored in separate columns in a base table. In such way, no explicit synopsis is created, but first digit may act as an implicit synopsis imbedded in the base table. Further, a range summary for first digit [1, 2] may be created, essentially generating an explicit synopsis of the implicit synopsis.

Some embodiments of the present invention provide a hybrid method to leverage both implicit and explicit synopsis. For example, a set of implicit synopsizes are created first for a set of original data, and then for each of the set of implicit synopsis (that is much smaller than the set of original data), an explicit synopsis is created.

Figure 5:
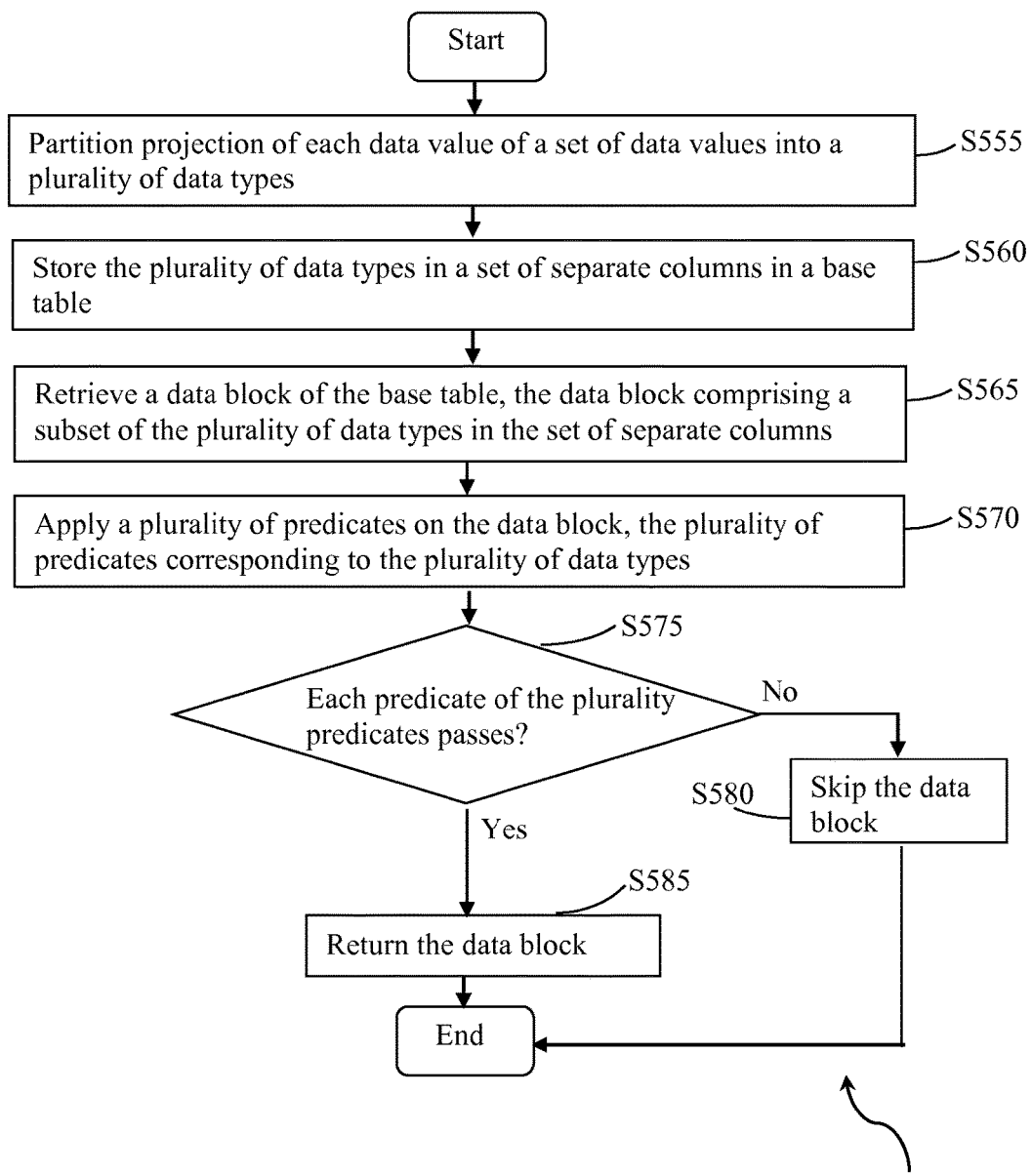
FIG. 5 is a flowchart showing a method performed, at least in part, by the second embodiment system.
Figure 6:
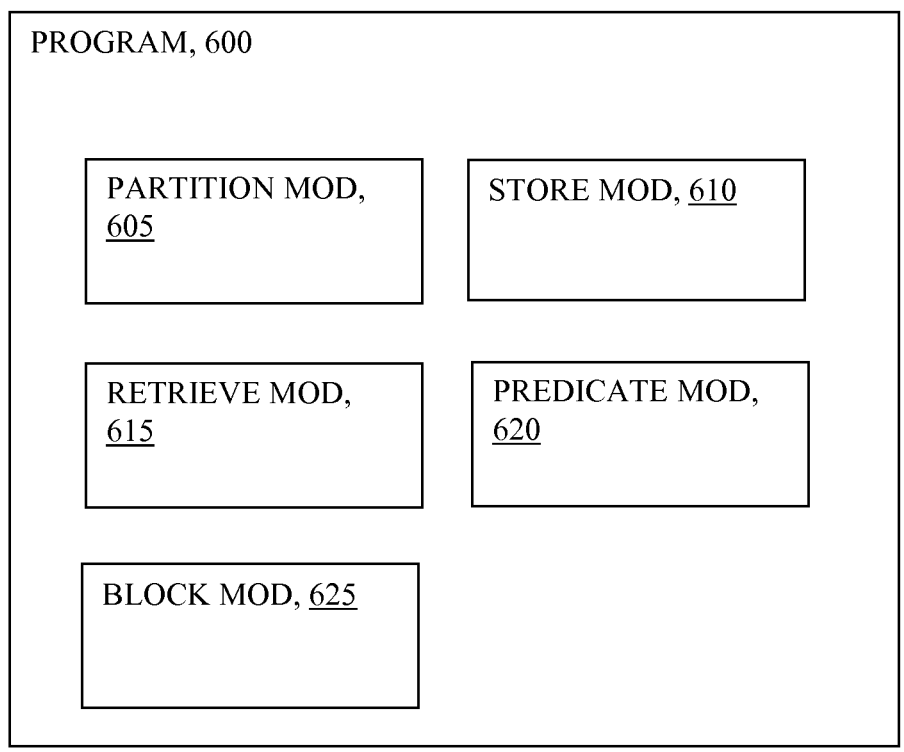
FIG. 6 is a schematic view of a machine logic (for example, software) portion of the second embodiment system.

FIG. 5 shows flowchart 500 depicting a first method according to the present invention. FIG. 6 shows program 600 for performing at least some of the method steps of flowchart 500. This method and associated software will now be discussed, over the course of the following paragraphs, with extensive reference to FIG. 5 (for the method step blocks) and FIG. 6 (for the software blocks).

Processing begins at step S555, where partition module ("mod") 605 partition projection of each data value of a set of data values into a plurality of data types. The date types include numerical or comparable bytes values, for example, an upper byte value and a lower byte value. In this example, unsorted dates, for example, including order date, invoice date, and shipping date, are considered. The order date, invoice date, and shipping date, are each partitioned vertically into year, month, and day.

Vertical byte partitioning of data involves changing the representation of the data. For example, a date column can be stored in three columns of shorter width such as year, month, day or a 32 bytes integer can be stored as four columns of 4 bytes. Furthermore, columns such as order date, invoice date, shipping date, and payment date are likely to be highly correlated on the year and month attributes. Therefore, a single year/month column can be used to represent three different columns. Therefore, by changing the representation of data, further compression and effective synopsis data skipping can be realized. For example, consider order date, invoice date, shipping date and payment date as a set of correlated columns, if a record is '2011-1-2', '2011-1-10', '2011-1-30', '2011-2-10', then this record goes to the year 2011 block (where a block is simply a chunk of data or a set of records).

Different partitioning techniques may be used for different types of data. For example, for date type, one way is to divide by day, month, and year, as done in this example. For larger strings or integer types, the partitioning methods depend on the data. Alternatively, the projection of each data value is performed by transforming each data value by a custom formula including geospatial grid, and dividing the transformed value into most significant digits and least significant digit.

Processing proceeds to step S560, where store module 610 stores the plurality of data types in a set of separate columns in a base table. In this example, as discussed herein, each data value of order date, invoice date, and shipping date, is partitioned vertically into year, month, and day. Thus, each order date comprises three columns (i.e., year, month, and day) in the base table, and each invoice date and each shipping date comprise their corresponding three columns in the base table.

Further, each column of the set of separate columns for the plurality of data types in the base table may be sorted, for example, by selling price, order date, and any other attributes.

Further, as mentioned briefly in step S555, a set of columns in the base table may be grouped by identifying correlated values for the set of columns, for example, finding correlation/similarity such as prefix, prost fix, or substrings. One example is given by considering two sets of data: set 1 including Jan. 1, 2000; Jan. 4, 2000; Jan. 10, 2000, and set 2 including Feb. 1, 2000; Feb. 4, 2000; Feb. 10, 2000. Each value of the two sets of data is divided into month, day and year that are stored in separate columns in a base table. As shown, the two sets of data have the same year value (i.e., 2000). So, instead of having two different columns for the year value for each set of data, the same year value column is shared by the two set of data, that is, the correlated values for a set of columns is stored only once. Thereby redundantly storing similar common parts may be avoided, which is, essentially, a form of lossless compression across columns.

Alternatively the plurality of data types in the set of separate columns may be compressed. In this example, TPC-H results for 1 GB database having about 6 million records are used for description. TPC-H is an industry standard benchmark for analytical workloads (Note: the term "TPC-H" may be subject to trademark rights in various jurisdictions throughout the world and are used here only in reference to the products or services properly denominated by the marks to the extent that such trademark rights may exist.) In the case where each data value in each date (e.g., order date, invoice date and shipping date) is not partitioned into an upper bytes value and a lower bytes value, the size of each date column on average is 53 MB without data compression, and 13 MB with data compression. However, in the case where each data value in each date is partitioned vertically into an upper bytes value and a lower bytes value (e.g., separated by year, month, and day), the size of the year column is 29 MB without data compression whereas 2.0 MB with data compression; the size of the month column is 18 MB without data compression whereas 3.5 MB with data compression; and the size of the day column is 18 MB without data compression whereas 4.9 MB with data compression. Thus, the total individually compressed size is 10.4 MB (2.0 MB+3.5 MB+4.9 MB) which is less than 13 MB when not partitioned vertically. Further, with the three year columns grouped (i.e., correlated but not sorted), the size of the grouped year column is 3.5 MB that is less than 6.0 MB where each ungrouped year column take about 2.0 MB.

Further, with the upper bytes values and the lower bytes values are sorted, the size of day column is 23 KB with data compression and 18 MB without data compression; the size of month column is 18 KB with data compression and 18 MB without data compression; and the size of year column ranges from about 43 KB to about 94 KB with data compression and 29 MB without data compression. The total individually compressed size is 84 KB (23 KB+18 KB+43 KB), which is less than 131 KB that is the compressed size of a single column sorted and not partitioned vertically. Further, with the three year columns grouped (i.e., correlated and sorted), the compressed size of the grouped year column is 183 KB that is less than 217 KB (43 KB+80 KB+94 KB) where each ungrouped year column take about 43 KB, 80 KB, and 94 KB respectively.

Processing proceeds to step S565, where retrieve module 615 retrieve a data block of the base table, and the data block comprises a subset of the plurality of data types. The data block herein refers to a chunk of data or a set of records. In this example, the data block is a set of records, comprising, such as, records 1-4 in Table 6. It should be noted that a subset, as the term is used herein, may include each of the set from which it is taken, that is, a subset of the plurality of data types may include all of the data types.

TABLE 6

Show a data block comprising a set of records with a block ID

| | | YEAR | ORDER MONTH | ORDER DAY | ... |
|---|---|---|---|---|---|
| Block ID: 001 | 1 | 2000 | 02 | 01 | |
| | 2 | 2000 | 02 | 02 | |
| | 3 | 2000 | 02 | 03 | |
| | 4 | 2000 | 02 | 04 | |
| | 5 | 2001 | 03 | 02 | |
| | 6 | 2001 | 01 | 02 | |

Processing proceeds to step S570, where predicate module 620 applies a plurality of predicates on the data block. The plurality of predicates corresponds to the plurality of data types. For example, if a query looks for a value that is 15, then a first predicate of the plurality of predicates may be applied on the upper byte type having a value that is "1,"

and a second predicate of the plurality of predicates may be applied on the lower byte type having a value that is "5."

Processing proceeds to step S575, where predicate module 620 determine whether or not the applied predicates pass the corresponding data types. In this example, if not passing, processing proceeds along the "no" branch to step S580 where the process skips the data block to end the query. Alternatively, if not passing, processing proceeds back (not shown) to step S565 to retrieve another data block for the query. In this example, the applied predicates do pass the corresponding data types of the data block, so processing proceeds along the "yes" branch to step S585.

At step S585, block module 325 returns the data block. In this the example, upon passing each predicate of the plurality of predicates applied on the corresponding data types, the data block is returned, for example, a block ID is used for identifying the block of data as shown in Table 6 for further subsequent pipeline processing.

The embedded synopsis of multi-column range summaries are beneficial because of the lower update cost and fewer objects to maintain that requires less DBA (database administrator) involvement in tuning/maintaining/replicating these objects. Some embodiments of the present invention may include one, or more, of the following features, characteristics and/or advantages: (i) efficient query processing (and data skipping) using multi-column range summaries; (ii) improvement over conventional multi-column range summaries to efficiently support a low selective query over unclustered data; (iii) bound and minimization of the replication factor in comparison with indexes and more accurate synopsis; (iv) minimum update cost because indexes are no longer needed.

What is claimed is:

1. A method for scanning and skipping data blocks, the method comprising:
    identifying a dataset for storage in a database, the dataset including a set of data values;
    partitioning the set of data values into a plurality of data bytes, the plurality of data bytes being associated with corresponding data values within the set of data;
    determining a set of first data bytes within the plurality of data bytes, the set of first data bytes corresponding to a first data type;
    assigning a high order to the first data type;
    determining a set of second data bytes within the plurality of data bytes, the set of second data bytes corresponding to a second data type;
    assigning a low order to the second data type;
    storing the plurality of data bytes in a set of columns, a high order column containing the first data type and the low order column containing the second data type, the set of first data bytes and the set of second data bytes maintaining an association with corresponding data values, wherein the set of data values are stored in the set of columns of the database;
    compressing the set of first data bytes in the high order column;
    establishing a vertical partition of the high order column dividing the high order column into a plurality of data blocks, each data block having a corresponding data byte and corresponding second data bytes in the low order column;
    responsive to receiving a query of the dataset, applying a plurality of predicates on the plurality of data blocks, the plurality of predicates corresponding to the plurality of data bytes; and
    searching only a subset of the second data type in the low order column, the subset corresponding to a subset of data blocks in the high order column meeting the plurality of predicates;
    wherein:
    at least the step of storing the plurality of data types is performed by computer software running on computer hardware.

2. The method of claim 1, further comprising:
    returning search results based only on a search of data types passing each predicate of the plurality of predicates.

3. The method of claim 1, wherein the step of partitioning the set of data values includes:
    transforming each data value into a multi-byte string corresponding to data types of a geospatial grid; and
    dividing the multi-byte string into the plurality of data bytes.

4. The method of claim 1, further comprising:
    identifying a set of correlated values from the set of data values;
    partitioning the set of correlated values into a common data byte and a set of corresponding low order data bytes, the common data byte being found within each correlated value; and
    storing the common data byte in the high order column and the low order data bytes in the low order column.

5. The method of claim 4, wherein the set of correlated values includes a prefix, a postfix, and/or a set of substrings.

6. The method of claim 1, further comprising:
    sorting the set of first data bytes in the high order column.

7. A computer program product for scanning and skipping data blocks, the computer program product comprising a computer readable storage medium having stored thereon:
    first program instructions programmed to identify a dataset for storage in a database, the dataset including a set of data values;
    second program instructions programmed to partition the set of data values into a plurality of data bytes, the plurality of data bytes being associated with corresponding data values within the set of data values;
    third program instructions programmed to determine a set of first data bytes within the plurality of data bytes, the set of first data bytes corresponding to a first data type;
    fourth program instructions programmed to assign a high order to the first data type;
    fifth program instructions programmed to determine a set of second data bytes within the plurality of data bytes, the set of second data bytes corresponding to a second data type;
    sixth program instructions programmed to assign a low order to the second data type;
    seventh program instructions programmed to store the plurality of data bytes in a set of columns, a high order column containing the first data type and the low order column containing the second data type, the set of first data bytes and the set of second data bytes maintaining an association with corresponding data values, wherein the set of data values are stored in the set of columns of the database;
    eighth program instructions programmed to compress the set of first data bytes in the high order column;
    ninth program instructions programmed to establish a vertical partition of the high order column dividing the high order column into a plurality of data blocks, each data block having a corresponding data byte and corresponding second data bytes in the low order column;

tenth program instructions programmed to, responsive to receiving a query of the dataset, apply a plurality of predicates on the plurality of data blocks, the plurality of predicates corresponding to the plurality of data bytes; and eleventh program instructions programmed to search only a subset of the second data type in the low order column, the subset corresponding to a subset of data blocks in the high order column meeting the plurality of predicates.

8. The computer program product of claim 7, further comprising:

twelfth program instructions programmed to return search results based only on a search of data types passing each predicate of the plurality of predicates.

9. The computer program product of claim 7, further comprising:

twelfth program instructions programmed to identify a set of correlated values from the set of data values;

thirteenth program instructions programmed to partition the set of correlated values into a common data byte and a set of corresponding low order data bytes, the common data byte being found within each correlated value; and fourteenth program instructions programmed to store the common data byte in the high order column and the low order data bytes in the low order column.

10. The computer program product of claim 9, wherein the set of correlated values includes a prefix, a postfix, and/or a set of substrings.

11. A computer system for scanning and skipping data blocks, the computer system comprising:

a processor(s) set; and
a computer readable storage medium;
wherein:
the processor set is structured, located, connected, and/or programmed to run program instructions stored on the computer readable storage medium; and
the program instructions include:
first program instructions programmed to identify a dataset for storage in a database, the dataset including a set of data values;

second program instructions programmed to partition the set of data values into a plurality of data bytes, the plurality of data bytes being associated with corresponding data values within the set of data values;

third program instructions programmed to determine a set of first data bytes within the plurality of data bytes, the set of first data bytes corresponding to a first data type;

fourth program instructions programmed to assign a high order to the first data type;

fifth program instructions programmed to determine a set of second data bytes within the plurality of data bytes, the set of second data bytes corresponding to a second data type;

sixth program instructions programmed to assign a low order to the second data type;

seventh program instructions programmed to store the plurality of data bytes in a set of columns, a high order column containing the first data type and the low order column containing the second data type, the set of first data bytes and the set of second data bytes maintaining an association with corresponding data values, wherein the set of data values are stored in the set of columns of the database;

eighth program instructions programmed to compress the set of first data bytes in the high order column;

ninth program instructions programmed to establish a vertical partition of the high order column dividing the high order column into a plurality of data blocks, each data block having a corresponding data byte and corresponding second data bytes in the low order column;

tenth program instructions programmed to, responsive to receiving a query of the dataset, apply a plurality of predicates on the plurality of data blocks, the plurality of predicates corresponding to the plurality of data bytes; and eleventh program instructions programmed to search only a subset of the second data type in the low order column, the subset corresponding to a subset of data blocks in the high order column meeting the plurality of predicates.

12. The computer system of claim 11, further comprising:
twelfth program instructions programmed to return search results based only on a search of data types passing each predicate of the plurality of predicates.

13. The computer system of claim 11, further comprising:
twelfth program instructions programmed to sort the set of first data bytes in the high order column.

14. The computer system of claim 11, further comprising:
twelfth program instructions programmed to identify a set of correlated values from the set of data values;
thirteenth program instructions programmed to partition the set of correlated values into a common data byte and a set of corresponding low order data bytes, the common data byte being found within each correlated value; and
fourteenth program instructions programmed to store the common data byte in the high order column and the low order data bytes in the low order column.

15. The computer system of claim 14, wherein the set of correlated values includes a prefix, a postfix, and/or a set of substrings.

16. The computer program product of claim 7, wherein the second program instructions programmed to partition the set of data values includes:
program instructions programmed to transform each data value into a multi-byte string corresponding to data types of a geospatial grid; and
program instructions programmed to divide the multi-byte string into the plurality of data bytes.

17. The computer system of claim 11, wherein the second program instructions programmed to partition the set of data values includes:
program instructions programmed to transform each data value into a multi-byte string corresponding to data types of a geospatial grid; and
program instructions programmed to divide the multi-byte string into the plurality of data bytes.

18. The computer program product of claim 7, further comprising:
twelfth program instructions programmed to sort the set of first data bytes in the high order column.

* * * * *